No. 739,473. PATENTED SEPT. 22, 1903.
F. E. BACHMAN.
FILTER.
APPLICATION FILED DEC. 13, 1901.
NO MODEL. 2 SHEETS—SHEET 2.

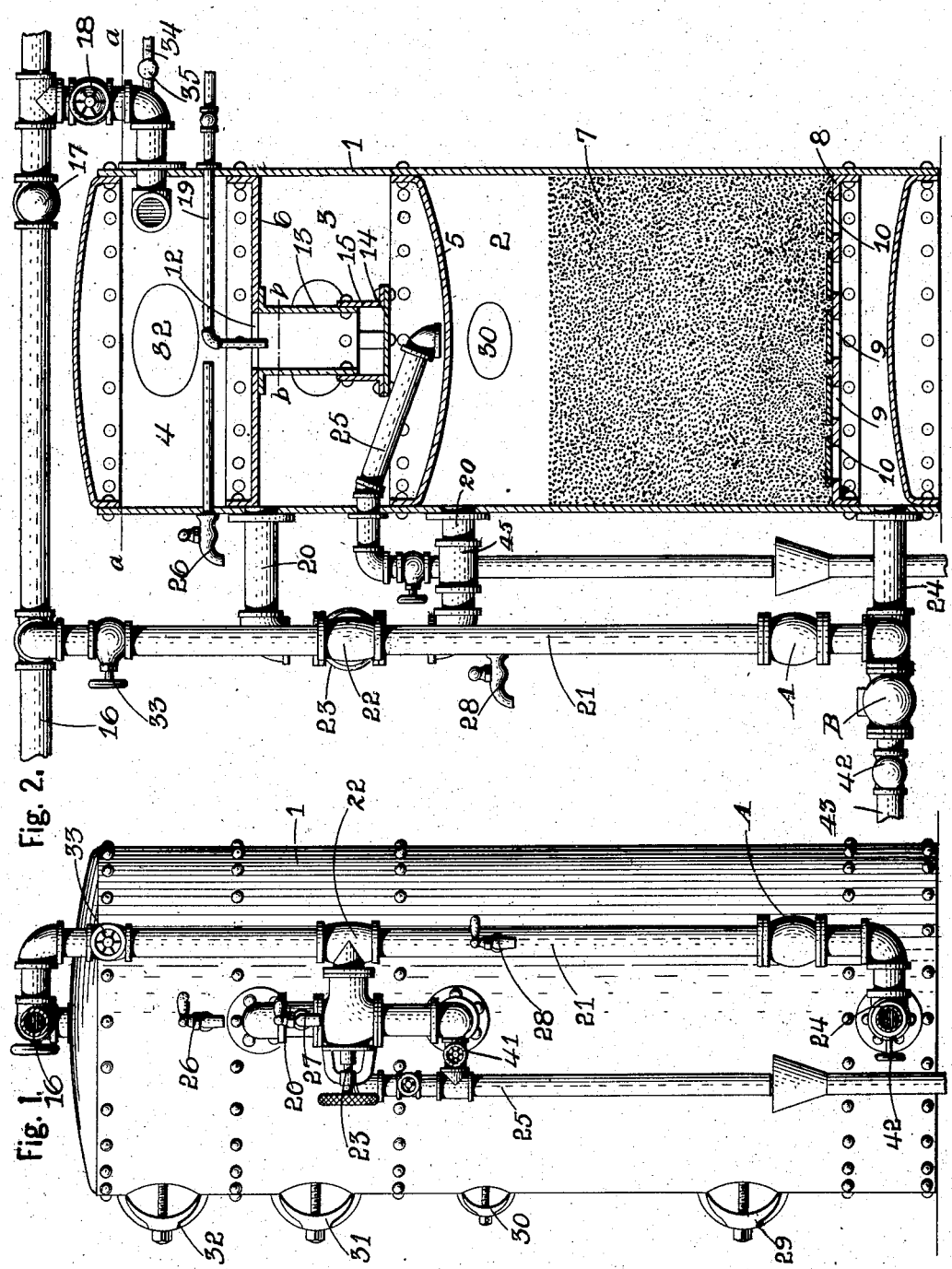

Witnesses.
L. M. Sangster.
Geo. A. Neubauer.

Inventor.
Frank E. Bachman.
By A. J. Sangster, Attorney.

THE NORRIS PETERS CO., PHOTO-LITHO., WASHINGTON, D. C.

No. 739,473. Patented September 22, 1903.

UNITED STATES PATENT OFFICE.

FRANK E. BACHMAN, OF BUFFALO, NEW YORK.

FILTER.

SPECIFICATION forming part of Letters Patent No. 739,473, dated September 22, 1903.

Application filed December 13, 1901. Serial No. 85,791. (No model.)

*To all whom it may concern:*

Be it known that I, FRANK E. BACHMAN, a citizen of the United States, residing at Buffalo, in the county of Erie and State of New York, have invented certain new and useful Improvements in Filters, of which the following is a specification.

This invention relates to an improved filter which is chiefly adapted to be used in connection with comparatively small filtering systems, the mixing, precipitating, and filtering of the water taking place in one tank or vessel.

The objects of the invention are to simplify and cheapen the construction of filters of this character.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 3:
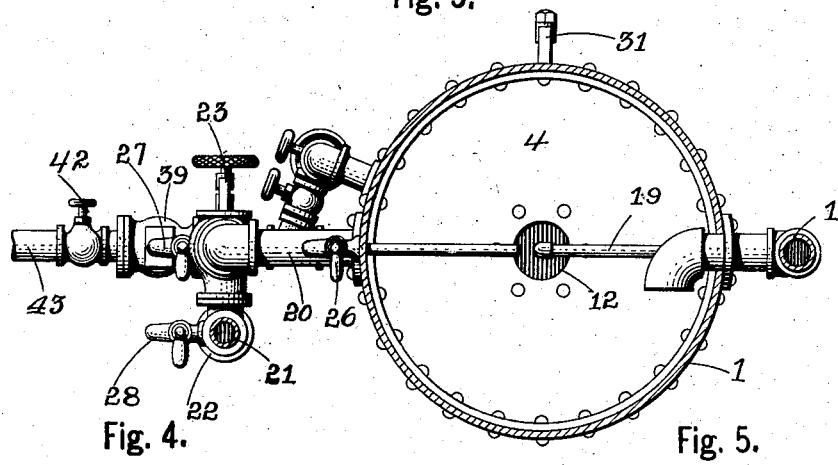
Figure 4:
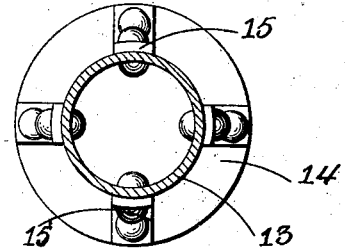
Figure 5:
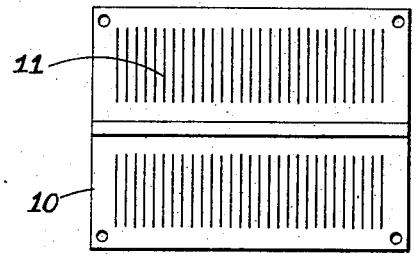
Figure 6:
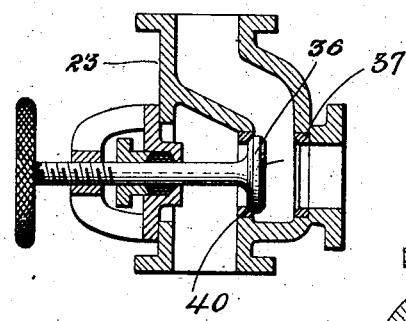
Figure 8:
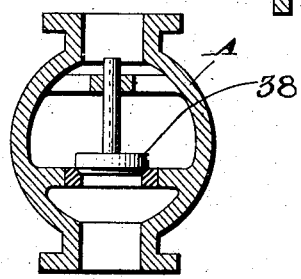
Figure 7:
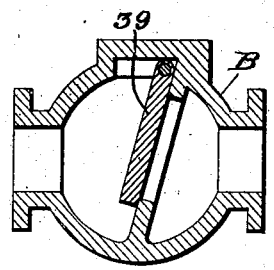

Figure 1 is a side elevation of the improved filter. Fig. 2 is a vertical section through the improved filter. Fig. 3 is a horizontal section on or about line $a\,a$, Fig. 2. Fig. 4 is an enlarged detached horizontal section through the vertical connecting-tube on line $b\,b$, Fig. 2. Fig. 5 is an enlarged detached view of one of the filter straining-plates. Fig. 6 is an enlarged vertical section through the three-way valve. Fig. 7 is an enlarged vertical section through the swinging leaf-valve. Fig. 8 is an enlarged vertical section through the check-valve.

In referring to the drawings in detail like characters designate like parts.

This improved filter is chiefly adapted to be used in connection with small filtering plants and is arranged so that the mixing of the water to be filtered with the precipitating chemicals, the precipitation of the impurities in the water, and the filtering of the precipitated impurities all take place in one tank or vessel.

1 represents the tank or vessel, which is divided into three compartments 2, 3, and 4 by plates or diaphragms 5 and 6. The lower compartment 2, which is the larger of the three compartments, occupying about half of the space in the tank, is filled or partially filled with granular filtering material 7. This filtering material is supported upon a horizontal plate 8, riveted in the tank a short distance above the bottom thereof and provided with a plurality of slots 9. (See Fig. 2.)

A series of straining-plates 10, preferably formed substantially as shown in Fig. 5, are arranged above the slots 9 and are each provided with a plurality of narrow slits 11.

The filtering-compartment 2 does not communicate with the upper mixing and precipitating compartments, except through piping, as will be more clearly hereinafter pointed out.

The upper mixing and precipitating compartment 4 is separated from the lower mixing or precipitating compartment 3 by the diaphragm or plate 6, which is provided with a central communicating opening 12, and a vertical tube 13 extends downward from said opening, being secured at its upper end to the plate 6 into the second compartment 3.

A deflecting-plate 14 is suspended below the lower end of the tube 13 by the connecting portions 15. The water-supply pipe 16 has one extreme extending within the first or upper precipitating-compartment 4, with its end curved to give a swirling movement to the water as it enters. This pipe is provided with shut-off valves 17 and 18 for connecting or disconnecting the upper compartment 4 from the water-supply.

19 is a pipe which extends from a source of chemical-supply for supplying precipitating chemicals to the water as it passes through the vertical tube 13, connecting the first and second precipitating-compartments 3 and 4.

The second precipitating-compartment 3 is connected to the filtering-compartment by a curved or bent pipe 20, and this pipe 20 is connected to a vertical pipe 21 by a connection 22, having a three-way valve 23, formed substantially as shown in Fig. 6.

The pipe 20 connects to the second or intermediate precipitating-compartment at or near the top thereof, so that the water flows out above the inlet and removes a large portion of the impurities from the water passing through while the filter-bed is being washed.

By this means the greater portion of the heavier impurities remain in the second compartment, thereby materially lightening the work of the filtering-compartment.

The upper extreme of the vertical pipe 21 connects to the water-supply pipe, and its lower extreme connects to a horizontal pipe 24, which extends from the lower portion of the filtering-compartment.

The heavier particles of the impurities which settle into the dished or concaved diaphragm 5 are removed through the blow-off pipe 25.

The object of the deflecting-plate 14 is to prevent the water passing through the vertical tube from stirring up or disturbing the heavier particles of impurities which settle against and rest on the diaphragm.

26, 27, and 28 are test-cocks for drawing water at various points in the vessel or tank to ascertain if the proper amount of precipitating chemicals have been added and if it has been properly filtered and purified.

Manholes 29, 30, 31, and 32 can be arranged at various parts of the tank or vessel to provide means for convenient access to the interior of the several compartments for repair or replacement of the parts. A cut-off valve 33 is arranged in the vertical pipe 21.

Precipitating chemicals are admitted to the water in the water-supply pipe before it enters the first precipitating-compartment by a pipe 34. This chemical-conducting pipe is provided with the usual shut-off valve 35.

An automatic check A is placed in the pipe 21, which preferably has a vertical valve part 38. (Shown in Fig. 8.)

A check-valve B, preferably formed substantially as shown in Fig. 7, is placed in the pipe 24 and has a swinging leaf part 39.

The three-way valve 23, preferably formed substantially as shown in Fig. 6, is provided with a valve-disk 36, which can be brought into contact with either of the opposed seats 37 and 40. The object of the three-way valve is to provide a means whereby the water from the second precipitating and settling chamber can pass directly to the discharge-pipe or to the filtering-compartment.

The operation is as follows: The valve 17 in the water-supply pipe being closed and valves 33 in the vertical pipe and 18 in the water-supply pipe being open, the water passes into the first precipitating-compartment 4, being given a swirling motion as it enters by the curved end of the pipe, as before described. The proper amount of the first chemical is introduced into the water through the pipe 34. The swirling motion of the water thoroughly mixes the precipitating chemicals therewith, so that the carbonates of lime, magnesia, and the iron and alumina compounds are precipitpted. The water receives the second precipitating chemical as it passes through the vertical tube and is deflected laterally by the deflecting-plate into the said second compartment, the heavier impurities settling against the diaphgrams 5, from which they are removed through the blow-off pipe, as before described. The partially-purified water now passes out of the second compartment into the pipe 20, and the disk 36 of the three-way valve being closed against the seat 37 the water flows into the filtering-compartment 2. The water then passes through the filtering material, the strainer-plates, out through the pipe 24, through the pipe 21 into the water-supply pipe, which conducts it to the desired point.

45 is a T, which connects the lower horizontal part or branch of the curved or bent pipe 20 to the valve 41. The automatic check-valve A opens away from the filter, so that the water-pressure in the pipe 21 closes it, and the check-valve B opens toward the filter and is held shut by the pressure in the pipe 24. The pipe 43 supplies water from an external source for washing the filter. This water must be at a head or pressure not in excess of the pressure in the pipe 24 when the filter is in operation. The valve 42 is used to regulate the amount of water used for washing and once being set so as to supply the proper amount of water needs no further attention.

To wash the filter, the disk of the three-way valve 23 is brought against the seat 40, allowing the partially-purified but as yet unfiltered water to pass directly from the compartment 3 through the three-way valve 23, the T 22, into pipe 21, and back to the supply-pipe 16, at the same time shutting the water off from the filter. There being now no flow of water through the check-valve A and the pressure on both sides of this disk being equal, the disk falls by gravity and closes the valve, so that no water passes through it. The pressure in the filter is then equal to or in excess of the pressure in the pipe 43, so that the leaf part 39 of the swinging check-valve B remains against its seat, and no water passes through it into the base of the filter. The wash-out valve 41 is then opened, allowing the water in the filter to pass out through the T 45, the valve 41, through the pipe 25 to the drain, relieving the pressure of the filter side of the check-valves A and B, automatically opening the leaf 39 of B and holding the disk 38 of A tighter against its seat, thus allowing the water from the pipe 43 to pass into the base of the filter through the pipe 24, up through the openings in the filter-head and strainer-plates, carrying the deposited sediment with it, out through the pipe 20, T 45, and valve 41 into the wash-out pipe 25, and thence to the drain and preventing its passage through to pipe 21, beyond the check-valve A. When the sediment has been removed, the wash-out valve 41 is closed. The pressure in the filter and the pipe 43 being then equal the leaf 39 of the check-valve B falls against its seat, closing it.

The disk 36 of the three-way valve 23 is then brought against the seat 37, and the water passes from the compartment 3 through pipe 20, the three-way valve 23, the T 45, into the filter-compartment 2, equalizing the pressure in the pipes 24 and 21, and the filtering operation is then resumed. It will be noted that the employment of the three-way valve on the inlet of the filter and the check-valve on the outlet prevents the stoppage of the flow of water and makes it impossible for the operator to bring excessive pressure on the filter by improper manipulation and that the check-valve in the wash-out-water-supply pipe, in conjunction with the three-way and check valve in the outlet, reduces the number of valves to be operated in washing from five or more, as are often used, to two, making the apparatus safe from damage by careless manipulation and more nearly automatic. It is obvious that it is not necessary to use a vertical check for A and a horizontal check for B, as by simply changing their location from horizontal to vertical pipes, or vice versa, the horizontal valve could be used in place of the vertical.

The filter-cleaning water passes into the filter at a lower pressure than the purified water in the pipe 21, so that the check and leaf valves are maintained in their relative positions throughout the cleansing operation.

The main advantages of this filter are its simplicity and cheapness, the small number of valves required to operate the same, and that the heavier particles of the impurities, which are extremely hard to wash, are collected in the second precipitating-compartment and do not enter the filtering-compartment, thereby rendering the filter easier to wash and requiring less frequent cleaning.

I claim as my invention—

1. A closed vertical tank combining into a single structure, a lower filtering-compartment, and at least two compartments above the filtering-compartment and means for introducing precipitating chemicals into at least one of said compartments.

2. A closed vertical tank combining in a single structure, a lower filtering-compartment, and at least two compartments above the filtering-compartment having direct communication with each other and means for introducing precipitating chemicals into at least one of said directly-communicating compartments.

3. A closed vertical tank containing liquid under pressure and divided into compartments by a dished diaphragm which forms a collecting-pocket for impurities and a blow-off pipe for removing the impurities from said diaphragm.

4. A filter-tank divided into compartments by diaphragms, and one of said diaphragms having an opening to afford communication between the compartments it partitions, a vertical tube extending from said opening and a horizontal deflecting-plate suspended from the lower extreme of said tube.

5. A closed tank divided into compartments by diaphragms, one of said diaphragms having an opening, a vertical tube extending from said opening and a deflecting-plate suspended from said tube.

6. A closed combined precipitating and filtering tank having a dividing-diaphragm which is dished to receive impurities, and a blow-off having one end extending in proximity to the dished diaphragm.

7. A closed combined precipitating and filtering tank having at least two directly-communicating compartments, and a filtering-compartment having indirect communication through piping with one of said directly-communicating compartments and means for introducing precipitating chemicals into said directly-communicating compartments.

8. A closed combined precipitating and filtering tank having at least two directly-communicating compartments, and a filtering-compartment beneath said compartments having indirect communication with at least one of said compartments and means for introducing precipitating chemicals into the upper compartments.

9. A closed vertical tank combining in a single structure, at least two directly-communicating compartments and a filtering-compartment connecting indirectly to at least one of said compartments and means for introducing precipitating chemicals into the said compartments.

10. A closed tank containing liquid under pressure and having a precipitating-compartment, a filtering-compartment below said precipitating-compartment and a dished unperforated diaphragmatic plate dividing said compartments, and means for introducing precipitating chemicals into the precipitating-compartment.

11. A closed tank containing liquid under pressure and having at least two compartments, a diaphragmatic plate separating said compartments and having an opening, a tube below said opening leading therefrom and a deflecting-plate below the tube.

12. A closed tank divided into compartments by diaphragms and one only of said diaphragms having an opening to afford communication between adjoining compartments and another diaphragm being dished, a blow-out pipe extending in proximity to said dished diaphragm, and a system of piping connecting the compartments divided by said dished diaphragm.

13. A closed multicompartment-tank containing liquid under pressure and having a precipitating-compartment, an inlet-pipe extending downward into said compartment, a deflecting-plate below the pipe, and a blow-off pipe adapted to remove the precipitating matter collected below the deflecting-plate.

14. A closed tank containing liquid under pressure and divided into compartments by diaphragms, and one of said diaphragms having an opening to afford communication between the compartment it partitions and another diaphragm being unperforated, a tube extending from said opening into one of said compartments and a pipe connecting said compartments and having one extreme connecting to the compartment into which the tube extends above the lower extreme of said tube.

15. A closed vertical tank containing liquid under pressure and divided into at least three compartments by diaphragms, one of said diaphragms having an opening, a tube extending from said opening into one compartment and a pipe connecting to said compartment above the lower extreme of the tube and connecting with another compartment.

16. A closed tank having an upper compartment provided with a curved inlet, a diaphragmatic plate forming the bottom of the upper precipitating-compartment and the top of an intermediate compartment and having an opening, a tube below the opening extending into the intermediate compartment, a deflecting-plate below the tube, a dished diaphragm below the deflecting-plate and a filtering-compartment below the dished diaphragm.

17. A closed pressure-tank having an upper compartment, an intermediate compartment, a diaphragmatic plate dividing said compartments and having an opening, a tube below the opening extending into the intermediate compartment, a deflecting-plate below the tube and an unperforated plate below the intermediate compartment and a filtering-compartment below the unperforated plate.

18. In a water-purifying apparatus, a precipitating-tank having a curved inlet, a diaphragmatic plate having an opening, a tube below the opening, and a deflecting-plate below the tube.

19. In a water-purifying apparatus, a precipitating-tank having a curved inlet, a diaphragmatic plate having an opening, a tube below the opening, a deflecting-plate below the tube and a filter.

20. In a water-purifying apparatus, a top precipitating-tank having a curved inlet, a diaphragmatic plate having an opening, a tube below said opening, a deflecting-plate below said tube and a blow-off pipe.

21. In a water-purifying apparatus, a top precipitating-tank having a curved inlet, a diaphragmatic plate having an opening, a tube below said opening, a deflecting-plate below said tube, a blow-off pipe and a filter.

22. In a water-purifying apparatus, a top precipitating-tank having a curved inlet, a diaphragmatic plate, a tube, a supply-pipe for the precipitating chemicals leading to the tube and a test-pipe ending above the outlet of the chemical-supply pipe.

23. A closed pressure-tank having an upper compartment, an intermediate compartment and a lower compartment, a diaphragmatic plate separating the upper and intermediate compartments and having an opening, a tube extending from said opening into the intermediate compartment, an unperforated dished plate between the intermediate and lower compartments and a blow-off pipe extending between the lower end of the tube and the dished plate.

24. In combination with a filter, a supply-pipe leading thereto, a three-way valve in said pipe, a pipe from said valve to the filter, having a branch pipe between the filter and the three-way valve, an outlet-pipe from the filter having a check-valve therein and a pipe from the three-way valve to the outlet-pipe.

25. A closed tank containing liquid under pressure and having a precipitating-compartment, a filtering-compartment below the precipitating-compartment, a pipe leading into the precipitating-compartment, a blow-out pipe for removing the precipitated impurities from the precipitating-compartment and a pipe connecting the precipitating-compartment to the filtering-compartment.

FRANK E. BACHMAN.

Witnesses:
L. M. SANGSTER,
GEO. A. NEUBAUER.